March 18, 1969  T. A. LJUNGBERG  3,432,930
DEVICE FOR THE ACCURATE MEASUREMENT OF LARGE DISTANCES
WITH AN UNSUPPORTED FLEXIBLE MEASURING TAPE
Filed Feb. 8, 1966
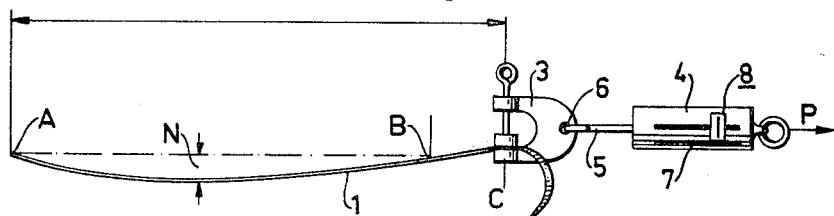
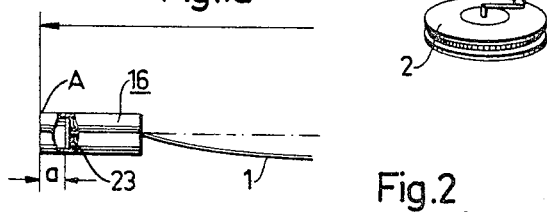
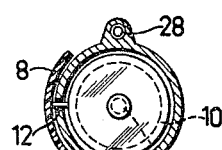
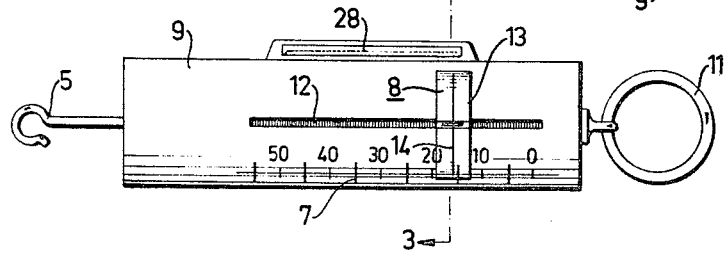
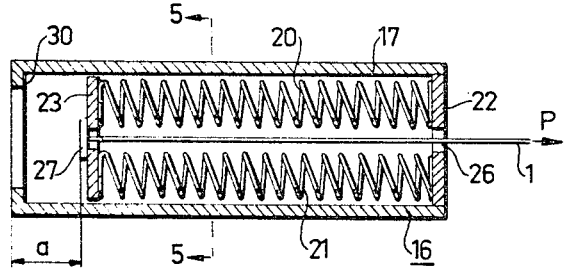
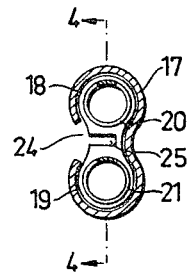
INVENTOR
TURE ANDERS LJUNGBERG
BY Young & Thompson
ATTYS.

United States Patent Office 3,432,930
Patented Mar. 18, 1969

3,432,930
DEVICE FOR THE ACCURATE MEASUREMENT OF LARGE DISTANCES WITH AN UNSUPPORTED FLEXIBLE MEASURING TAPE
Ture Anders Ljungberg, Badstigen 6, Stuvsta, Stockholm, Sweden
Filed Feb. 8, 1966, Ser. No. 525,889
Claims priority, application Sweden, Feb. 25, 1965, 2,422/65
U.S. Cl. 33—137      4 Claims
Int. Cl. G01b *3/10*

ABSTRACT OF THE DISCLOSURE

A spring balance is adapted to be clamped to a length of flexible measuring tape to hold the tape horizontal and freely suspended. The spring scale is calibrated to read in terms of suspended tape length, thus directly establishing the right tension to be applied to just compensate for the sag error. If the tape is of relatively inextensible material, then a relatively readily extensible insert such as a coil compression spring device may be provided at the free end of the tape.

---

When taking measurements with a long, flexible, freely sagging measuring tape the tape is subjected to a certain tensile stress which causes the tape to be somewhat extended. When the scale is printed (in the manufacture of a long tape or is applied to the tape in some other manner) it is therefore subjected to a certain pre-selected tensile stress, for example 5 kg. If the tape is then loaded with the selected tensile stress during the taking of measurements, said stress being indicated by a spring balance attached to the tape, the measuring units will be correctly indicated, that is to say those errors will be avoided which would occur if the tape had been provided with a scale but without pre-stress and then had been loaded during measurement with the pre-stress causing extension.

A further measuring error occurs if a flexible unsupported measuring tape is employed for measuring large distances and the tape therefore sags by an amount that depends on the magnitude of the tensile force and the measuring length. To enable correct measurement to be carried out despite the sag, it was common practice to employ tables which listed the measuring error due to the sag in relation to the tape length. The dimension indicated by the measuring tape was then corrected on the basis of the table. The error can of course also be calculated but this is more awkward than the use of a table.

In practical operation tables are also too awkward to be used by workers engaged in building operations, and for this reason surveying work leaves much to be desired. For reasons which are evident, it is however very important to be able to measure long lengths accurately, particularly for the purpose of prefabrication of large parts used in building constructions and other fields where such parts have to fit accurately.

The invention relates to a device for the direct correction of such sag errors without the aid of tables and calculations.

The device in accordance with the invention is characterized in that a flexible measuring tape which has the length required for carrying out the measurement is coupled to a spring balance by which a tensile force is exerted on the tape and said spring balance is provided with a calibration in units of length so that on loading the tape with a tensile force which occurs when the spring balance pointer indicates a division of the spring balance scale coinciding with the measuring tape length, this tensile force will have a value calculated to compensate for the sag of the tape caused by this tensile force.

In order that the invention may be more clearly understood, one particular embodiment thereof will now be described, by way of example, with reference to the accompanying drawings in which:

FIGURE 1 illustrates a method of carrying out a precise measurement of a large distance with the aid of an unsupported measuring tape;

FIGURE 1a illustrates a variation of such a method;

FIGURE 2 is a side view of the spring balance with a scale for the device in accordance with FIGURE 1;

FIGURE 3 is a section along the line 3—3 in FIGURE 2;

FIGURE 4 shows on an enlarged scale a compensator for use with the device in accordance with FIGURE 1; the compensator being shown as a longitudinal section along the line 4—4 in FIGURE 5; and, FIGURE 5 is a cross section of the compensator along the line 5—5 in FIGURE 4.

Referring now to FIGURE 1, a long flexible steel measuring tape 1 (for exmaple, 50 m. long), is wound in a measuring tape casing 2. It will be assumed that it is desired to measure the distance between two points A and B with the aid of the measuring tape. The free end of the measuring tape is attached to the measuring point A. The distance on the measuring scale of the tape is indicated at the measuring point B while the tape is loaded with a certain tensile force P. To exert this force a screw clamp 3, eccentric clamp or similar device is attached to the tape 1 at a point C somewhat behind the point B, this clamp being easily movable together with a spring balance 4 and being connected to it, the usual load hook 5 of the spring balance being engaged in a hole 6 of the screw clamp.

In accordance with the invention the scale 7 of the spring balance is not calibrated in units of weight (kilogrammes or kilogrammes force) but in units of length (metres) especially calculated or empirically determined for the measuring tape 1 in use, in such a way that if the measuring tape is loaded with the aid of the spring balance 4 with a tensile force sufficiently high to ensure that the spring balance pointer 8 indicates on the scale 7 that longitudinal dimension which corresponds to the spacing between the two points A and C or to the drawn out, used length of tape, the measuring tape will be stressed with a tensile force which is just large enough to ensure that the measuring tape extension resulting from the tensile force just compensates the sag N.

Referring now to FIGURES 2 and 3, the spring balance contains a coiled tension or compression spring 10 which is housed in known manner, in a tubular casing and is connected to a load hook 5 which extends outward through one end of the casing. The conventional ring 11 for retaining the spring balance can be attached to the other end of the casing. The casing 10 is provided with a longitudinal slot 12 through which the pointer or indicator 8 projects. The pointer may, for example as indicated, take the form of a curved transparent plastic plate 13 which is provided with a cursor line 14 for the spring balance scale 7 located below.

The tape sag can thus be compensated by corresponding extension of the tape if a suitable tape material is employed.

If the tensile stress required to extend the tape becomes too large for practical reasons, it is possible for the longitudinal scale divisions of the tape scale to be so altered that the measuring result is correct with a tensile force which must be empirically increased with increasing measuring tape lengths and therefore increasing sag. Such a varying length of the dimensional units on the scale in which the units become the larger the further the scale is followed towards the interior, suffers from the disadvantage that measuring errors result if the measuring tape is supported.

In accordance with the invention it is therefore proposed to include in series with the measuring tape an element (compensator) which is fited into the measuring section but has a higher extensibility than the measuring tape itself. This compensator can be provided at any desired point of the measuring section.

The method of attachment of the compensator to the free end A of the measuring tape can be seen in FIGURE 1a. The compensator itself is designated 16 and shown in detail in FIGURES 4 and 5.

A tubular housing 17, for example one having the cross section shown in FIGURE 5, consists of two associated cylindrical spaces 18 and 19, each of which is provided with a coil spring 20 and 21 respectively. These springs rest with one of their ends against an end plate 22 at the end of the housing 17. The two other spring ends rest against a plate 23 which is longitudinally movable in the housing 17 and whose contour corresponds to the internal housing cross section. The housing 17 is provided on one of its sides with a slot 24. The end plate 22 and the plate 23 each have a slot 25 or 26 so that the end of the measuring tape 1 can be pushed into the slot from the side. The measuring edge 27 of the measuring tape end will then rest against the plate 23 as indicated in FIGURE 5.

When the measuring tape is relaxed the plate 23 is pressed by the springs 20, 21 against a flange 30 at the free end of the housing. This housing end must be placed against the measuring point A. The measuring edge 27 of the measuring tape will then coincide with the measuring point A. During measurement the measuring tape is loaded with the necessary tensile force P by the spring balance. As a result of the displacement a of the plate 23 and due to the elongation of the measuring tape 1, the dimension indicated at B will be correct despite the sag N.

The temperature naturally also has a certain effect on the measured result. Measuring errors due to using the measuring tape at temperatures other than that for which the tape is provided with its scale can be corrected by calculation or with the aid of tables. It is however also possible to provide the spring balance with several scales 7 or curves for different temperatures or temperature ranges. For this purpose, the spring balance can be provided with a thermometer 28, fitted into or onto the spring balance, see FIGURE 2.

What I claim is:
1. A device for the accurate measurement of large distances, comprising an elongated flexible measuring tape having length markings therealong, a spring balance, and means for connecting the spring balance to the measuring tape at any selected point along the measuring tape, said spring balance having a scale marked thereon and indicator means movable along the scale in response to changing tension in the spring balance, said scale consisting in a series of length markings corresponding to length markings on the measuring tape, said scale length markings being so positioned and spaced that when said connecting means is connected to the tape a certain distance from a point on the tape at which it is held fixed and the spring balance is tensioned to tension the tape until the indicator means on the spring balance indicates on the spring balance scale said certain distance, the elongation of the tape under the influence of said spring means will equal the sag error due to the tape when freely suspended over said distance so that distance measurements read from the tape at least adjacent said connecting means will be accurate.

2. A device as claimed in claim 1, and an element of greater extensibility than the tape connected in series with the tape between said connecting means and said fixed point.

3. A device as claimed in claim 2, said element comprising a housing, spring means in said housing, and means for applying the force of said spring means to an end of the measuring tape.

4. A device as claimed in claim 3, said housing comprising a side wall having a longitudinal slot therethrough and through which said end of the measuring tape can be pushed in order to be coupled with the spring means.

References Cited
UNITED STATES PATENTS

| 603,157 | 4/1898 | Spitzenberg | |
| 1,199,471 | 9/1916 | Lemassena | 33—137 |
| 2,157,723 | 5/1939 | Wilson | 73—143 |

FOREIGN PATENTS 23,363  12/1893  Great Britain.

ROBERT B. HULL, *Primary Examiner.*

U.S. Cl. X.R.

73—143